Jan. 4, 1966  R. J. HOLDEN, JR  3,227,101
VALVE OPERATOR FOR RAILWAY TANK CARS
Filed Feb. 17, 1964  3 Sheets-Sheet 1

INVENTOR.
ROY J. HOLDEN, JR.
BY
AGENT

Jan. 4, 1966    R. J. HOLDEN, JR    3,227,101
VALVE OPERATOR FOR RAILWAY TANK CARS
Filed Feb. 17, 1964    3 Sheets-Sheet 2

United States Patent Office 3,227,101
Patented Jan. 4, 1966

3,227,101
VALVE OPERATOR FOR RAILWAY TANK CARS
Roy J. Holden, Jr., St. Charles, Mo., assignor to ACF Industries, Incorporated, New York, N.Y., a corporation of New Jersey
Filed Feb. 17, 1964, Ser. No. 345,251
7 Claims. (Cl. 105—358)

This invention relates to a valve operator and more particularly to a valve operator for a bottom outlet valve on a railway vehicle and the like.

Heretofore, bottom outlet valves on tanks carried by railway or highway vehicles have had valve operators which were accessible to only one side or the top of the vehicle. At times, it is highly inconvenient to actuate the valve from such positions and a workman often moves around or over the vehicle in order to obtain access to the valve operator. This is time consuming and involves hazards which may be dangerous to the workmen.

It is an object of the present invention to provide a valve operator for a bottom outlet valve on a generally cylindrical tank carried by a highway or railway vehicle which valve may be easily actuated from either side of the vehicle.

A further object of the invention is the provision of such a valve operator which is easily fitted beneath and within a longitudinally extending beam support for the tank and is easily accessible for actuation from either side of the vehicle carrying the tank.

Briefly, the invention comprises a linkage operatively connected to the operating arm of a ball valve structure on the bottom outlet of a generally cylindrical tank carried by a vehicle, and a lever on each side of the vehicle connected to the linkage, the handles extending outwardly from the opposite sides of the tank and each being accessible for actuating the valve. The arrangement is particularly adaptable for a vehicle having a center sill structure supporting the tank and comprising a pair of spaced vertical web members with the bottom outlet valve structure extending from the tank between the web members. The valve operator is so constructed as to fit beneath and extend between the spaced web members for actuating the operating arm of the valve member and moving the valve member between open and closed positions, the handle or lever on each side of the vehicle being mounted to exert leverage on the linkage to the operating arm thereby to actuate the valve member from either side of the vehicle.

The invention accordingly comprises the constructions hereinafter described, the scope of the invention being indicated in the following claims.

In the accompanying drawings, in which one of various possible embodiments of the invention is illustrated, FIGURE 1 is a side elevation of a railway vehicle illustrating the invention on the bottom outlet valve structure thereof;

Corresponding reference characters indicate corresponding parts throughout the several views of the drawings.

Figure 1:
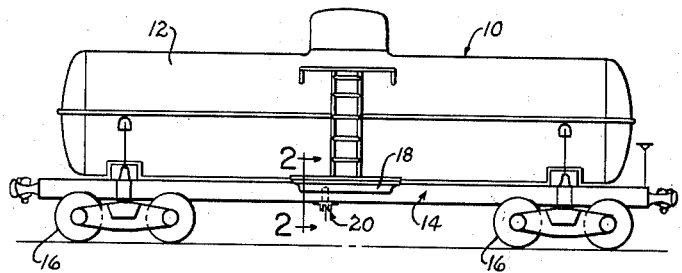

Referring to the drawings, the invention is illustrated on a railway vehicle such as a railway tank car 10 having a generally cylindrical tank shell 12 and a longitudinally extending center sill structure 14 mounted on trucks 16. A tank anchor 18 on each side of car 10 secures shell 12 to the center sill structure 14 adjacent a bottom outlet structure indicated generally at 20.

Figure 2:
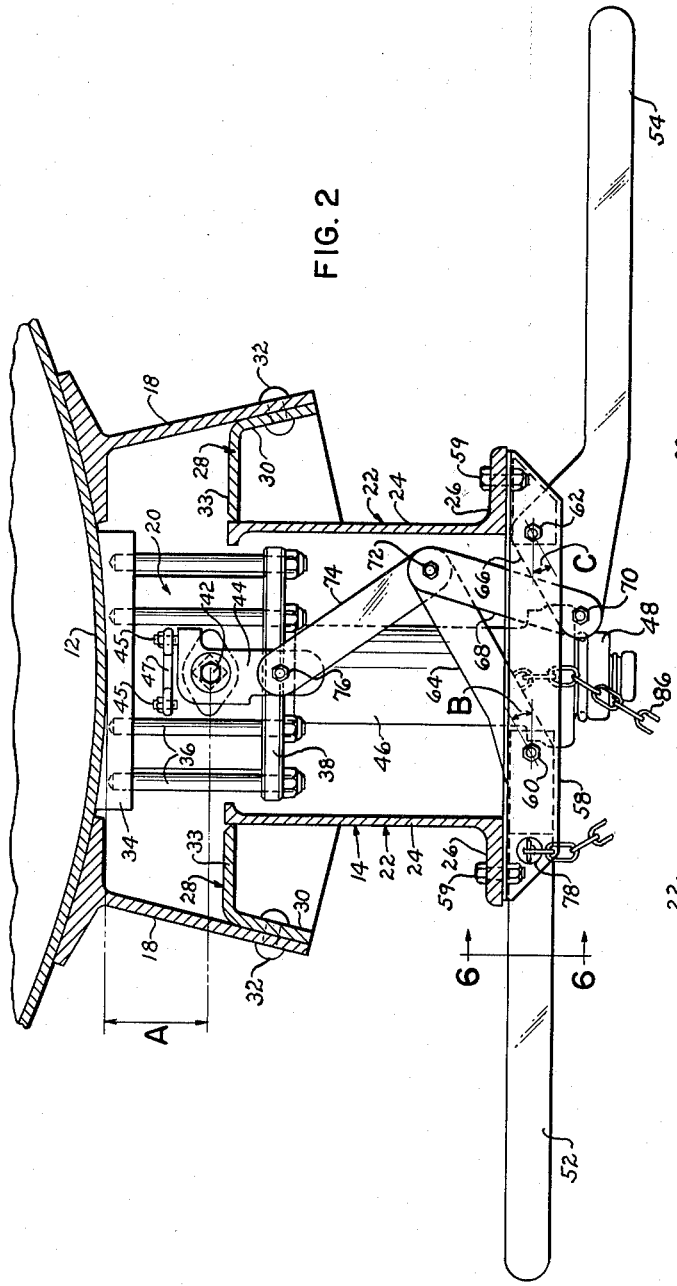
FIGURE 2 is a sectional view taken generally along line 2—2 of FIGURE 1 and showing the valve operator in elevation in the closed position of the valve member.
Figure 5:
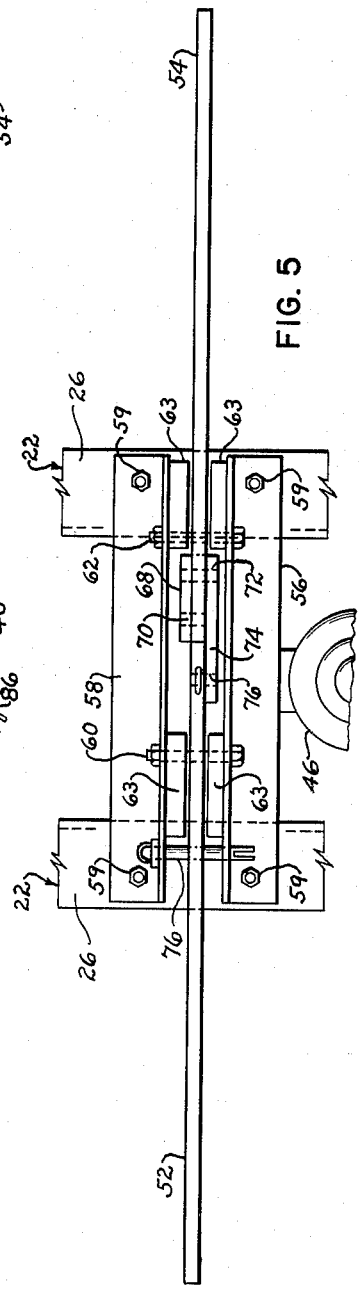
FIGURE 5 is a bottom plan of the valve operator of FIGURES 2–4.

Referring to FIGURE 2, center sill structure 14 comprises a pair of spaced sills 22, each having a vertical extending web 24 and a lower outwardly extending leg or flange 26. Anchor 18 on each side of shell 12 is of a T-shape and each is welded to the adjacent tank shell 12. A support angle 28 is positioned between each anchor 18 and the adjacent sill 22. Leg 30 of each support angle 28 is riveted at 32 to the adjacent web of T-shape anchor 18. Leg 33 of each support angle 28 is secured, such as by welding, to the adjacent sill 22.

Figure 4:
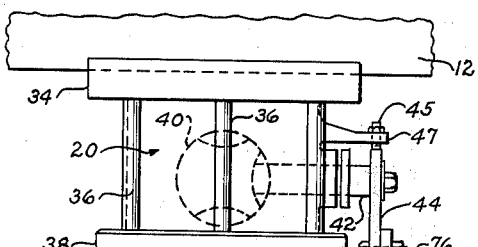
FIGURE 4 is a fragmentary side view of the valve operator shown in FIGURES 2 and 3.

Secured to the underside of shell 12 between anchors 18 is a mounting plate 34 for bottom outlet structure 20. Extending from plate 34 are studs 36 extending through lower flange 38 of outlet structure 20. A ball outlet valve or valve member 40 is secured between plates 34 and 38. Valve member 40 (FIGURE 4) is of a conventional type having a shaft 42 secured to an operating arm 44 and movable through an arc of 90° for opening and closing ball valve 40. Set screws 45 on extension 47 of structure 20 prevent arm 44 from rotating past the closed and open positions of valve member 40 as shown in respective FIGURES 2 and 3. Extending downwardly from valve 40 is an outlet pipe 46 to permit discharge of the lading carried within tank shell 12 when valve 40 is opened. A removable cap 48 on the end of pipe 46 is provided. To heat valve 40 and the lading around the valve in the event of relatively cold weather or when liquids of a relatively high viscosity are being carried by car 10, a steam pipe 50 extends downwardly generally alongside outlet pipe 46 and may be secured, such as by a removable clamp, to the adjacent sill 22. A suitable source of steam (not shown) may be connected to pipe 50 when it is desired to discharge such lading from the car. Outlet structure 20 extends downwardly in the area between spaced sills 22 which form the center sill structure 14 of the car.

For moving arm 44 through an arc of around 90° and constituting an important feature of this invention, a lever or handle 52 extends in a generally horizontal direction from one side of the railway car and a handle 54 extends in a generally horizontal direction from the opposite side of the car. Support angles 56 and 58 are secured, such as by bolt and nut combinations 59 to flanges 26 of sills 22 and extend transversely of car 10 between the sills. Handles 52 and 54 are pivotally mounted on respective pins 60 and 62 which extend between spacer blocks 63 on angles 56 and 58 and are supported thereby. It should be noted that the axis of pin 62 is generally beneath the adjacent sill 22 while the axis of pin 60 is positioned between sills 22.

Figure 3:
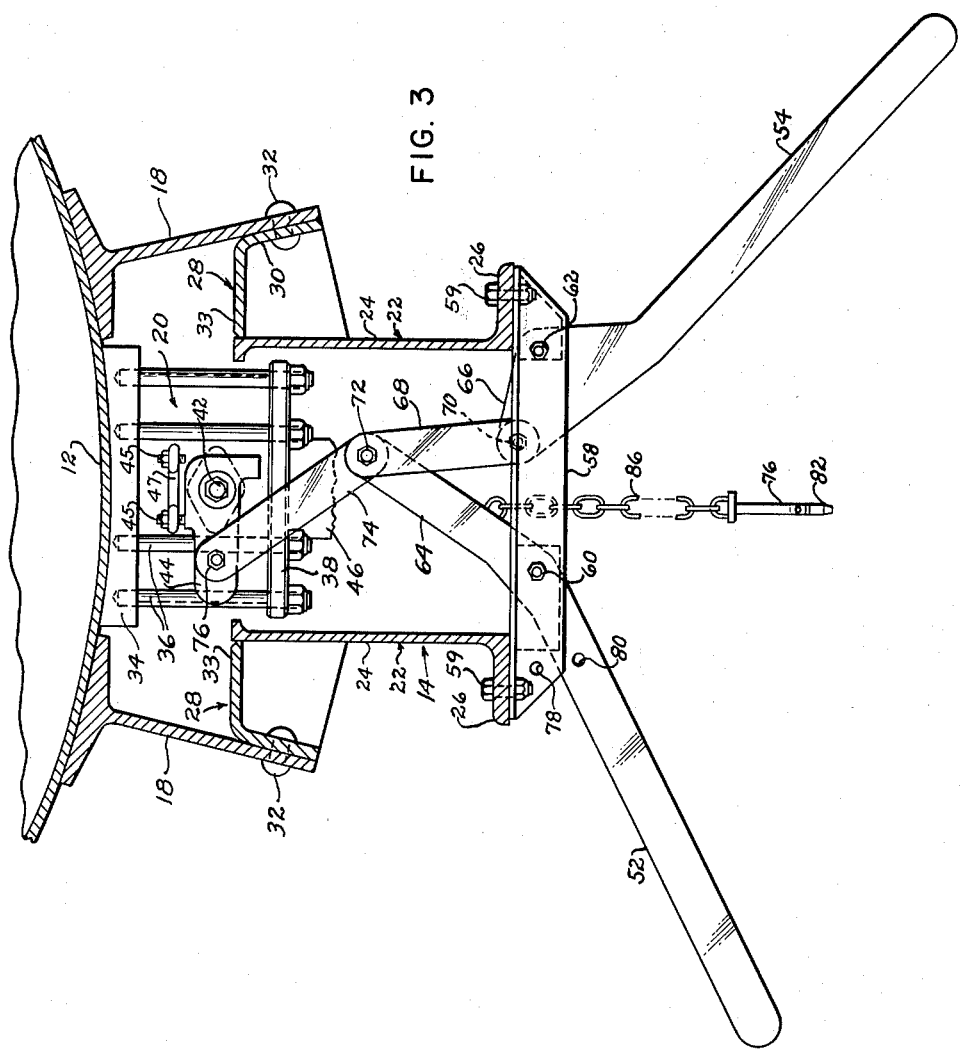
FIGURE 3 is a sectional view similar to FIGURE 2 but showing the valve operator in the open position of the valve member.

Extending from the inner end of handle 52 and integral therewith is an inner end portion or arm 64 which extends upwardly in the area between sills 22. Handle 54 has an inner end portion or arm 66 extending downwardly from its pivotal connection. Extending between arms 64 and 66 is a link 68 pivotally connected at 70 to arm 66 and pivotally connected at 72 to arm 64. Connecting link 68 with operating arm 44 is a connecting link 74 pivotally connected at 76 to operating arm 44 and at 72 to the pivotal connection of link 68 and arm 64. The arrangement of links 68 and 74 is such that operating arm 44 may be moved through an angle of 90° in the space provided between sills 22. As handles 52 and 54 both act through a common pivot 72, actuation of either one of handles 52, 54 results in a simultaneous actuation of the other remaining handle. FIGURE 2 shows handles 52, 54 in the closed position of valve member 40 while FIGURE 3 shows handles 52, 54 in an open position of valve member 40 with operating arm 44 rotated 90° to a generally horizontal position.

Figure 6:
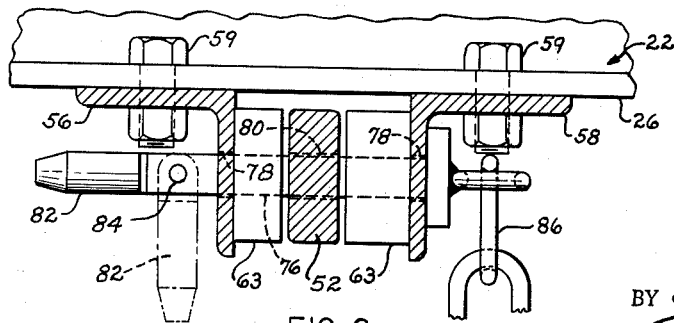
FIGURE 6 is a section taken generally along line 6—6 of FIGURE 2 and illustrating the locking means for the valve operator.

To lock handles 52, 54 in the closed position of valve member 40, a locking pin 76 is illustrated in FIGURE 6 extending through aligned openings 78 in support angles 56 and 58. An opening 80 in handle 52 is alignable with openings 78 in the closed position of valve 40. End 82 of pin 76 is pivoted at 84 and upon insertion of pin 76 within aligned openings 78 and 80, end 82 may be pivoted 90° with respect to the longitudinal axis of pin 76 as indicated by broken lines in FIGURE 6. A suitable chain 86 is connected to pin 76 to prevent the removal of the pin from car 10. Since handles 52, 54 move simultaneously, the retaining of one handle prevents the other handle from being moved.

The distance between the pivotal mounting of handles 52, 54 and the pivotal connection to operating arm 44 will vary depending on such factors as, for example, the depth of sills 22 or the distance from the shell to the axis of shaft 42 indicated by A in FIGURE 2. Therefore, handles 52, 54 and link 68 are made of generally standard or fixed dimensions with link 74 varying in length according to the distance between operating arm 44 and the pivotal mounting of the handles. Links 68 and 74 must be constructed and arranged so as to permit the simultaneous movement of both handles 52, 54 when either of the handles is depressed or pivoted downwardly to open valve 40. For example, arm 64 extends upwardly at an angle B of 30° and arm 66 extends downwardly at angle C of 30° with respect to a horizontal plane passing through the pivotal axis of handles 52, 54 in the closed position of valve member 40 as shown in FIGURE 2. Link 74 may vary in length in relation to distance A while link 68 will usually be of a fixed length if handles 52 and 54 are of fixed dimensions. Thus, the only member that requires a change in dimensions in length upon a change in distance A is link 74.

Valve 20 and the valve operator constituted by handles 52, 54 and the linkage may be removed as a unit. Bolt and nut combinations 59 are first removed to release support angles 56 and 58. Next, the securing means for the steam pipe 50, such as a removable clamp, is removed. Then, the nuts on studs 36 may be unscrewed to permit removal of the entire unit including valve member 40. The structure may be reassembled in a reverse manner.

While the mechanism for operating the valve structure has been illustrated for use on a railway car, it is to be understood that this structure would be suitable for use in the event the tank is mounted on a highway vehicle. Although locking pin 76 is positioned on one side of the railway car, it is normally removed by the workman who connects outlet pipe 46 to suitable discharge means. Thus, locking 76 is already removed before the arrival of a separate workman to actuate valve member 40. Further, locking pin 76 is easily removed from the side of railway car 10 on which handle 54 is positioned by merely reaching under the center still structure 14 and pulling locking pin 76 from aligned openings 78 and 80.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In a vehicle having a generally cylindrical tank shell, a center sill structure extending longitudinally of the vehicle comprising a pair of spaced generally vertical web members and a bottom outlet valve structure extending from the shell between the web members including a valve member operatively connected to an operating arm and movable between open and closed positions, the improvement of a valve operator for the operating arm of said valve member comprising a separate lever mounted beneath each web member for pivotal movement about a generally horizontal axis adjacent the associated superjacent web member, each lever having a portion on one side of its pivotal axis extending outwardly beneath the associated web member in a direction generally transversely of the vehicle and an inner end portion on the opposite side of its pivotal axis extending beneath and inwardly of the adjacent web member, one of said levers being pivotally mounted at a position intermediate the spacing of the web members and having its inner end portion extending upwardly from its pivotal axis into the area between the web members in the closed position of the valve member, a link pivotally connected at one end to the inner end portion of said one lever and pivotally connected at its opposite end to the operating arm for the valve member, and a second link pivotally connected at one end to the inner end portion of the other lever and pivotally connected at its other end along a common axis with said one lever and said first-mentioned link, said links being of such dimensions as to fit generally in the area between the web members in the closed position of the valve and to be actuated upon movement of either lever thereby to move the operating arm for opening and closing of the valve member.

2. In a vehicle as set forth in claim 1 wherein the other of said levers has its inner end portion extending downwardly from its pivotal axis in the closed position of the valve member.

3. In a vehicle as set forth in claim 1 wherein a pair of generally parallel spaced support members extend between and are carried by the vertical web members, said levers being pivotally mounted between and supported by the support members.

4. In a vehicle as set forth in claim 3 wherein one of said levers and said support members each have an opening alignable in the closed position of the valve member, and a removable locking pin extending through said aligned openings to releasably retain the levers in the closed position of the valve member.

5. In a railway tank car having a center sill structure extending longitudinally of the car and including a pair of spaced vertical web members, and a bottom outlet valve extending between the web members having an operating arm mounted about a horizontal axis for movement through an arc of ground 90° for opening and closing the valve, a valve operator for swinging the operating arm between open and closed positions of the valve, said valve operator comprising a lever mounted for pivotal movement generally adjacent the underside of one web member and having an outer end portion extending outwardly from the adjacent web member generally transversely of the tank car in the closed position of the valve, a second lever mounted for pivotal movement generally adjacent the underside of the other web member and having an outer end portion extending outwardly from the car on the side thereof opposite said first-mentioned lever, one of the levers having an inner end portion extending upwardly from its pivotal connection in the area between the web members, a link pivotally connected at one end to said inner end portion and pivotally connected at the opposite end to the operating arm for the valve, the other lever having an inner end portion extending downwardly from its pivotal mounting to a position generally beneath the area defined by the spaced web members, and a second link pivotally mounted at one end to said downwardly extending inner end portion and pivotally mounted at its opposite end along a common axis with the pivotal mounting of said one lever and the first-mentioned link, said links being of such dimensions as to fit generally in the area between the web members and to be actuated upon movement of either lever thereby to move the operating arm for opening and closing of the valve member.

6. In a railway tank car as set forth in claim 5 wherein said levers are mounted for pivotal movement along a common horizontal plane and movement of one lever results in a simultaneous movement of the other lever, said levers being positioned adjacent the underside of the web members and each outer end portion extending generally in a horizontal direction from the adjacent web member in the closed position of the valve, the outer end portions of said lever being movable downwardly to open said valve.

7. In a railway tank car as set forth in claim 6 wherein the inner end portion of said one lever extends upwardly from its pivotal mounting at an angle of about 30° with respect to a horizontal plane, and the inner end portion of said other lever extends downwardly from its pivotal mounting at an angle of around 30° with respect to a horizontal plane.

References Cited by the Examiner

UNITED STATES PATENTS

| | | | |
|---|---|---|---|
| 1,134,546 | 4/1915 | Morris | 251—289 |
| 1,807,842 | 6/1931 | Harris | 251—289 |
| 1,856,914 | 5/1932 | Hitchcock | 251—289 |
| 1,857,266 | 5/1932 | Sudduth | 251—289 |
| 3,176,764 | 4/1965 | Barbera | 105—360 |

ARTHUR L. LA POINT, *Primary Examiner.*